United States Patent
Inwood et al.

(10) Patent No.: US 9,909,528 B2
(45) Date of Patent: Mar. 6, 2018

(54) PISTON WITH ABRADABLE COATING TO GENERATE APPROPRIATE CONTACT GEOMETRY ON RUNNING SURFACE

(71) Applicant: Federal-Mogul Corporation, Southfield, MI (US)

(72) Inventors: Bruce Inwood, Fenton, MI (US); Jeffrey L. Riffe, Troy, MI (US)

(73) Assignee: Federal-Mogul LLC, Southfield, MI (US)

( * ) Notice: Subject to any disclaimer, the term of this patent is extended or adjusted under 35 U.S.C. 154(b) by 447 days.

(21) Appl. No.: 14/613,603

(22) Filed: Feb. 4, 2015

(65) Prior Publication Data

US 2015/0219042 A1 Aug. 6, 2015

Related U.S. Application Data

(60) Provisional application No. 61/935,518, filed on Feb. 4, 2014.

(51) Int. Cl.
*F16J 1/01* (2006.01)
*F02F 3/10* (2006.01)
(Continued)

(52) U.S. Cl.
CPC ............... *F02F 3/10* (2013.01); *F02B 79/00* (2013.01); *F16J 1/16* (2013.01); *Y10T 29/49263* (2015.01)

(58) Field of Classification Search
CPC ..... F02F 3/10; F16J 1/16; F02B 79/00; Y10T 29/49263
(Continued)

(56) References Cited

U.S. PATENT DOCUMENTS

| | | | |
|---|---|---|---|
| 4,648,309 A | * | 3/1987 | Schellmann ............ F02F 3/022 123/193.6 |
| 4,656,711 A | * | 4/1987 | Yagi ....................... B23P 15/10 264/162 |

(Continued)

FOREIGN PATENT DOCUMENTS

| | | |
|---|---|---|
| FR | 2076799 A5 | 10/1971 |
| JP | 2003013802 A | 1/2003 |
| JP | 2013167209 A | 8/2013 |

OTHER PUBLICATIONS

International Search Report, dated Apr. 14, 2015 (PCT/US2015/014409).

*Primary Examiner* — Marguerite McMahon
(74) *Attorney, Agent, or Firm* — Robert L. Stearns; Dickinson Wright, PLLC (57) ABSTRACT

A piston including an abradable coating applied to a round surface of the piston is provided. The shape of the round surface is not greater than 0.1 mm from a circular shape, and thus is relatively inexpensive to machine. As the piston reciprocates in an internal combustion engine, the abradable coating rubs against another component, such as a cylinder liner or wrist pin, to achieve suitable contact geometry, such as an oval, asymmetric, or other non-round shape. Thus, a costly machining process is not required to achieve the desired contact geometry. The abradable coating can also be applied to ring lands, skirt sections, or along pin bores of the piston. The abradable coating can also be applied to a wrist pin or an opening of a connecting rod which receives the wrist pin. The abradable coating can be formed from a polymer-based material or an aluminum-silicon alloy-based material.

18 Claims, 5 Drawing Sheets

(51) Int. Cl.
    *F02B 79/00*     (2006.01)
    *F16J 1/16*     (2006.01)

(58) Field of Classification Search
    USPC ............... 123/193.6; 92/187; 29/888.048
    See application file for complete search history.

(56) References Cited

U.S. PATENT DOCUMENTS

| | | | |
|---|---|---|---|
| 4,716,817 A * | 1/1988 | Ripberger | F02F 3/022 |
| | | | 123/193.6 |
| 5,172,626 A | 12/1992 | Hart | |
| 5,239,955 A * | 8/1993 | Rao | F02B 77/02 |
| | | | 123/193.4 |
| 5,257,603 A | 11/1993 | Bauer et al. | |
| 5,261,321 A * | 11/1993 | Whitacre | F02F 1/183 |
| | | | 92/177 |
| 5,266,142 A | 11/1993 | Penrice | |
| 5,435,872 A | 7/1995 | Penrice | |
| 5,435,873 A | 11/1995 | Penrice | |
| 5,469,777 A | 11/1995 | Rao et al. | |
| 5,477,820 A | 12/1995 | Rao et al. | |
| 5,560,283 A | 10/1996 | Hannig | |
| 5,884,600 A | 3/1999 | Wang et al. | |
| 6,544,234 B1 | 4/2003 | Gabriel | |
| 8,408,116 B2 * | 4/2013 | Fussner | F02F 3/105 |
| | | | 29/888.048 |
| 2007/0771990 | 3/2007 | Suman | |
| 2008/0156185 A1 * | 7/2008 | Perrone | F16J 1/16 |
| | | | 92/187 |
| 2008/0163751 A1 | 7/2008 | Subramanian et al. | |
| 2010/0095837 A1 | 4/2010 | Suman | |
| 2011/0232480 A1 | 9/2011 | Kemnitz et al. | |

\* cited by examiner

PISTON WITH ABRADABLE COATING TO GENERATE APPROPRIATE CONTACT GEOMETRY ON RUNNING SURFACE

CROSS REFERENCE TO RELATED APPLICATION

This U.S. utility application claims the benefit of U.S. provisional application Ser. No. 61/935,518, filed Feb. 4, 2014, which is incorporated herein by reference in its entirety.

BACKGROUND OF THE INVENTION

1. Field of the Invention

This invention relates generally to pistons for internal combustion engines, and methods of manufacturing the same.

2. Related Art

Pistons used in internal combustion engines should be designed with appropriate contact geometry for sliding along a cylinder of the internal combustion engine. Oftentimes, an outside running surface, such as the surface of a piston skirt, is machined to an oval shape, in cross-section, to meet such requirements. However, the process of machining the metal material of the piston to the desired oval shape is expensive and requires specialized equipment.

Wrist pin bores of pistons are also typically formed to an appropriate shape, such as a non-round shape, for accommodating a wrist pin as the piston reciprocates in the cylinder of the engine. This profiled wrist pin bore is also expensive to manufacture, due to the process steps and equipment required to machine the metal material.

SUMMARY OF THE INVENTION

One aspect of the invention provides a piston for use in an internal combustion engine capable of achieving appropriate contact geometry without a costly machining step. The piston includes a body portion presenting an outer surface, and a portion of the outer surface presents a shape that is not greater than 0.1 mm from a circular shape. An abradable coating is applied to that round portion of the outer surface for rubbing against at least one other component of the internal combustion engine and thus achieving the appropriate contact geometry, for example an oval, asymmetric, or other non-circular shape.

The invention also provides a piston assembly for use in an internal combustion engine. The assembly includes a piston, a connecting rod, and a wrist pin for connecting the piston to the connection rod. The piston includes a body portion presenting an outer surface. The body portion also includes a crown and pair of pin bosses depending from the crown and spaced from one another about a center axis. Each of the pin bosses defines a pin bore. The connecting rod includes a connecting end which is disposed between the pin bosses of the piston. The connecting end has a connecting surface defining a pin opening, and the pin opening is axially aligned with the pin bores of the piston. The wrist pin extends through the aligned pin bores of the piston and pin opening of the connecting rod for connecting the piston to the connecting rod. The wrist pin presents a contact surface facing the pin bosses and the connecting surface of the connecting rod. At least one of the pin bosses of the piston, the connecting surface of the connecting rod, and the contact surface of the wrist pin includes a portion presenting a shape which is not greater than 0.1 mm from a circular shape, and an abradable coating is applied to that portion of the at least one surface.

Yet another aspect of the invention provides a method of manufacturing a piston for use in an internal combustion engine. The method includes providing a body portion of a piston presenting an outer surface, wherein a portion of the outer surface presents a shape which is not greater than 0.1 mm from a circular shape. The method further includes applying an abradable coating to that portion of the outer surface for rubbing against at least one other component of the internal combustion engine.

Another aspect of the invention provides a method of manufacturing a piston assembly for use in an internal combustion engine, wherein the assembly includes a piston, a connecting rod, and a wrist pin. The method includes providing a body portion of the piston, wherein the body portion presents an outer surface. The body portion also includes a crown, and a pair of pin bosses depending from the crown and spaced from one another about a center axis. Each of the pin bosses defines a pin bore. The method further includes providing the connecting rod with a connecting end for being disposed between the pin bosses of the piston, wherein the connecting end presents a connecting surface defining a pin opening for being axially aligned with the pin bosses of the piston. The method also includes providing the wrist pin for extending through the aligned pin bosses of the piston and pin bore of the connecting rod for connecting the piston to the connecting rod. The wrist pin presents a contact surface for facing the pin bosses and the connecting surface of the connecting rod. The method further includes applying an abradable coating to at least one of the pin bosses of the piston, the connecting surface of the connecting rod, and the contact surface of the wrist pin including a portion presenting a shape being not greater than 0.1 mm from a circular shape.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF ENABLING EMBODIMENTS

One aspect of the invention provides a piston 20 with an abradable coating 22 for an internal combustion engine, as shown in the Figures. During use of the piston 20 in the internal combustion engine, the abradable coating 22 rubs against another component, such as a cylinder liner or wrist pin, and wears down to a suitable shape. The abradable coating 22 can be applied to a round running surface of the piston 20 and then wears down to generate an appropriate contact geometry, for example an oval, asymmetric, or other non-circular shape, during the "running-in phase" of operation. Thus, extensive and costly machining of the piston to achieve the appropriate contact geometry is no longer required. In addition to reducing manufacturing costs by reducing the amount of machining, the abradable coating 22 also has the potential to reduce oil consumption, blow-by, emission output, noise, cylinder liner cavitation, and the number of rings from three to two.

Figure 6:
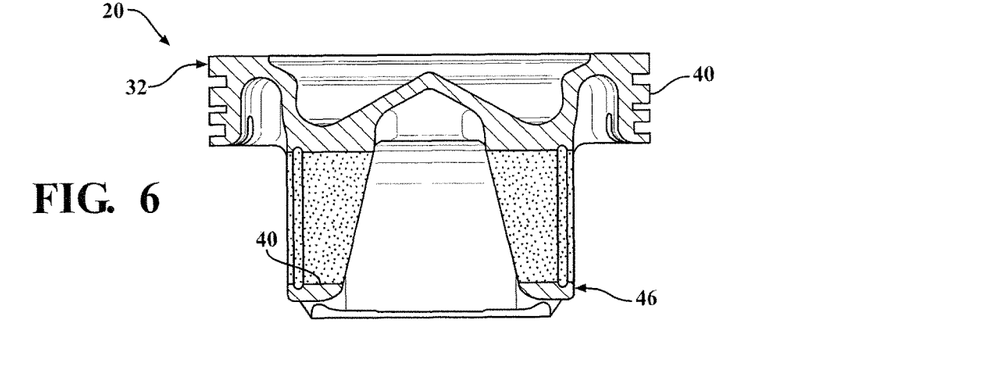
FIG. 6 is a cross-sectional view of a diesel piston without a cooling gallery and including the abradable coating, according to an exemplary embodiment.
Figure 7:
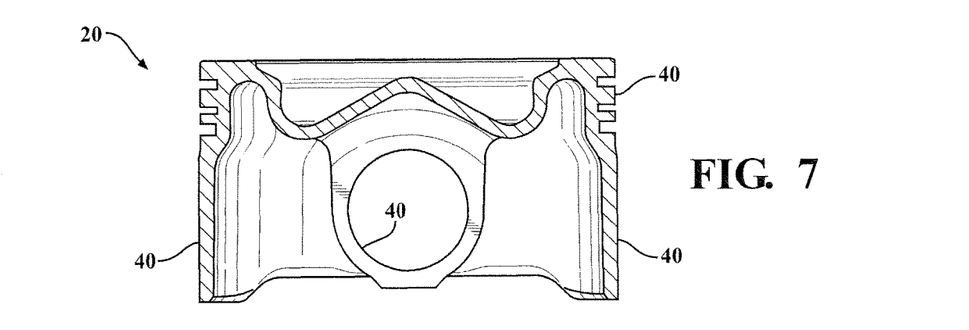
FIG. 7 is another cross-sectional view of the piston of FIG. 6.
Figure 8:
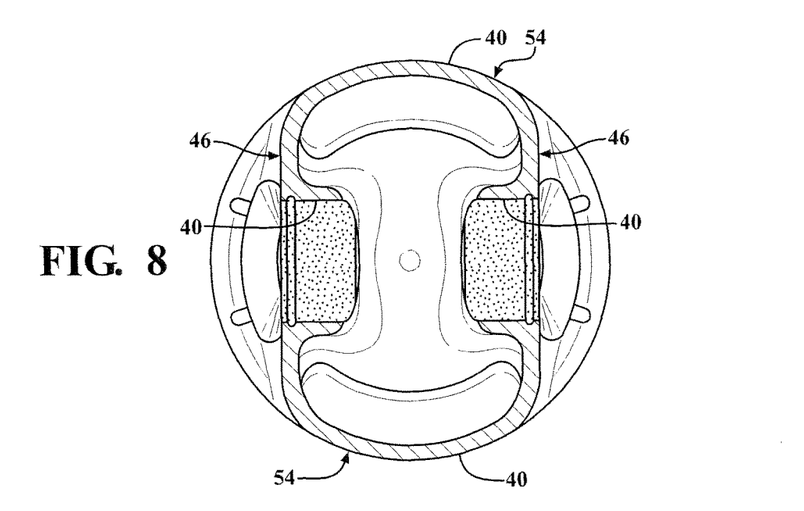
FIG. 8 is a bottom view of the piston of FIG. 6.
Figure 9:
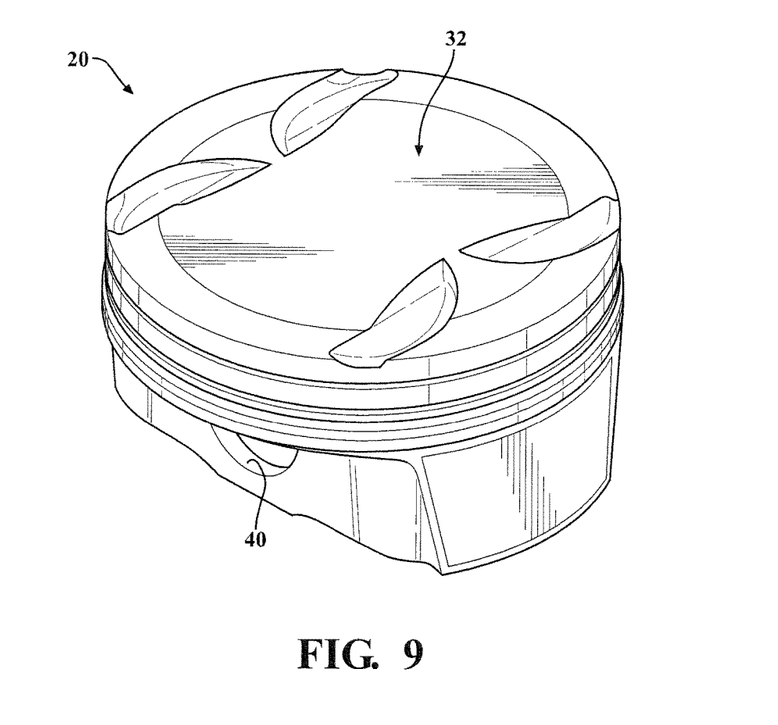
FIG. 9 is a perspective view of a gasoline piston formed of aluminum without a cooling gallery and including the abradable coating, according to an exemplary embodiment.
Figure 10:
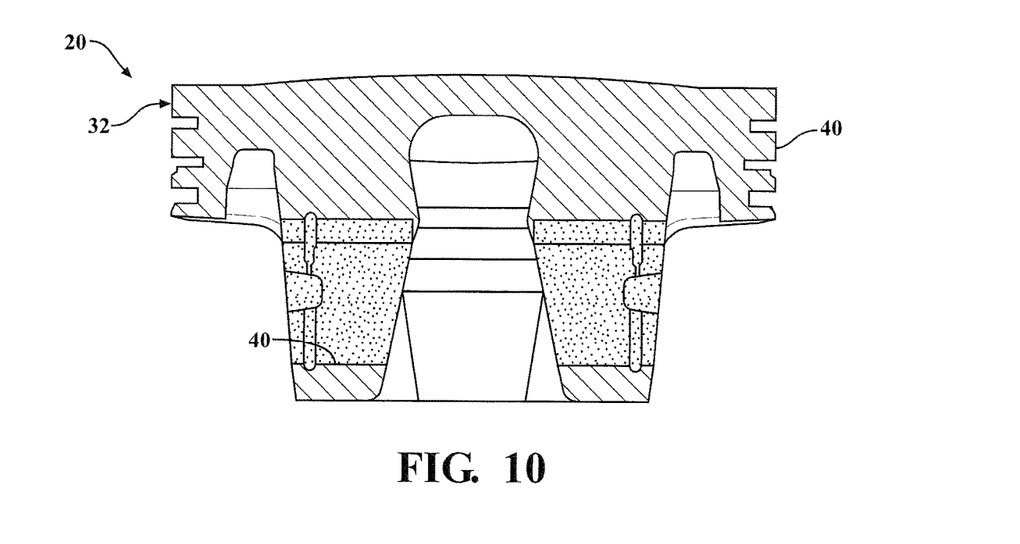
FIG. 10 is a cross-sectional view of the piston of FIG. 9.

The abradable coating 22 can be applied to many types of pistons, for example diesel, gasoline, ethanol, 2-stroke, and 4-stroke pistons, including pistons with or without a cooling gallery. FIGS. 1-5 illustrate an exemplary diesel piston 20 formed of steel and including a cooling gallery 24, FIGS. 6-8 illustrate an exemplary diesel piston 20 formed of steel without a cooling gallery, and FIGS. 9 and 10 illustrate an exemplary gasoline piston 20 formed of aluminum without a cooling gallery. Although not shown, another example of the type of piston to which the abradable coating 22 can be applied is a diesel piston formed of aluminum, with or without a cooling gallery.

In the exemplary embodiments, the piston 20 includes a body portion 26 formed of a metal material. The metal material is typically an iron-based material or an aluminum-based material, but other materials could be used. The body portion 26 extends around a center axis A and longitudinally along the center axis A from an upper end 28 to a lower end 30. The piston 20 also includes a crown 32 extending circumferentially about the center axis A from the upper end 28 toward the lower end 30. In the embodiment of FIGS. 1-5, the crown 32 is joined to the remainder of the body portion 26, in this case by welding.

The crown 32 of the piston 20 defines at least one ring groove 36 extending circumferentially about the center axis A for receiving at least one ring (not shown). Typically the piston 20 includes two or three ring grooves 36. Ring lands 38 are disposed adjacent each ring groove 36 and space the ring grooves 36 from one another. The outer surface 40 of the ring lands 38 can be machined or otherwise formed to a generally "round" shape, which is a shape that is not greater than 0.1 millimeter (mm) from a circular shape. Although the round shape is less costly to machine than an oval shape or another non-round shape, the oval or other non-round shape is typically desired to achieve appropriate contact geometry between the ring lands 38 and cylinder liner of the internal combustion engine.

As stated above, the piston 20 can be formed with or without a cooling gallery 24. In the embodiment of FIGS. 1-5, the piston 20 includes the cooling gallery 24 extending circumferentially around the center axis A between the crown 32 and the remainder of the body portion 26. In this embodiment, the crown 32 includes a pair of upper ribs 42 spaced from the center axis A and from one another, the adjacent section of the body portion 26 includes a pair of lower ribs 44 spaced from the center axis A and from one another, and the upper ribs 42 are welded to the lower ribs 44 to form the cooling gallery 24. In this case, the ribs 42, 44 are friction welded together, but the ribs 42, 44 may be joined using other methods. The cooling gallery 24 can contain a cooling fluid to dissipate heat away from the hot crown 32 during use of the piston 20 in the internal combustion engine. In addition, cooling fluid can be sprayed into the cooling gallery 24 or along an interior surface of the crown 32 to reduce the temperature of the crown 24 during use in the internal combustion engine. The pistons 20 of FIGS. 6-10 are formed without a cooling gallery 24.

Figure 11:
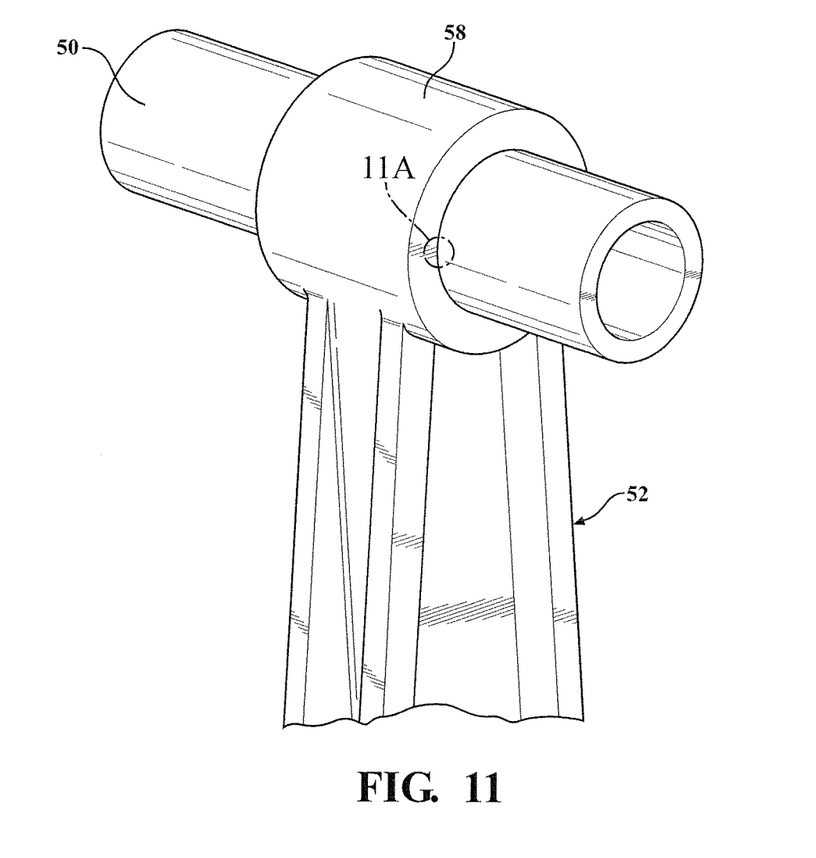
FIG. 11 is a connecting rod and wrist pin that can be coupled to the piston to form a piston assembly, according to an exemplary embodiment.

The body portion 26 of the piston 20 further includes a pair of pin bosses 46 spaced from one another about the center axis A and depending from the crown 32 to the lower end 30. The outer surface 40 along each of the pin bosses 46 faces inwardly and defines a pin bore 48 for receiving a wrist pin 50 which can be used to connect the piston 20 to a connecting rod 52, as shown in FIG. 11. The outer surface 40 of the pin bosses 46 along the pin bore 48 may be machined or otherwise formed to a generally "round" shape, which is a shape that is not greater than 0.1 mm from a circular shape.

The body portion 26 also includes a pair of skirt sections 54 spacing the pin bosses 46 from one another about the center axis A and depending from the crown 32 to the lower end 30. The outer surface 40 of the skirt sections 54 may also be machined or otherwise formed to a generally "round" shape, which is a shape that is not greater than 0.1 mm from a circular shape. In this case, the skirt sections 54 present the round shape when the piston 20 completes the casting or forging process, without any machining and before any post-casting or post-forging steps. Although the round shape is less costly to create than the oval shape, the oval shape is typically desired to achieve appropriate contact geometry between the skirt sections 54 and cylinder liner of the internal combustion engine.

As alluded to above, the abradable coating 22 is applied along portions of the outer surface 40 of the piston 20 which initially have the round shape in order to obtain a suitable contact geometry, such as the desired oval, asymmetric, or other non-round shape, without the costly machining process. The abradable coating 22 can be formed of various different compositions which wear down when rubbed against another component, such as the cylinder liner or wrist pin. In the exemplary embodiments, the abradable coating 22 is formed of a polymer-based material or an aluminum-silicon alloy-based material. The abradable coating can also include fillers or additives, such as graphite, hexagonal boron nitride, and/or molybdenum disulfide. For example, the abradable coating 22 can consist of a polymer and graphite; a polymer and an aluminum-silicon alloy; an aluminum-silicon alloy and graphite; or an aluminum-silicon alloy and hexagonal boron nitride. The abradable coating 22 can be applied to any thickness t, but is typically applied to a thickness t ranging from 20 µm to 400 µm.

Figure 1:
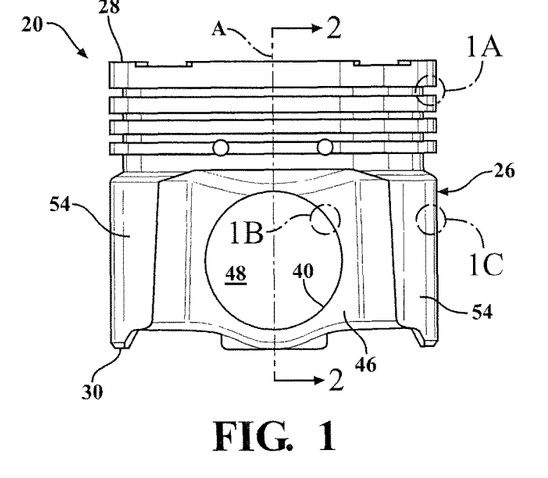
FIG. 1 is a side view of a diesel piston formed of steel and including a cooling gallery and an abradable coating, according to an exemplary embodiment.
Figure 1A:
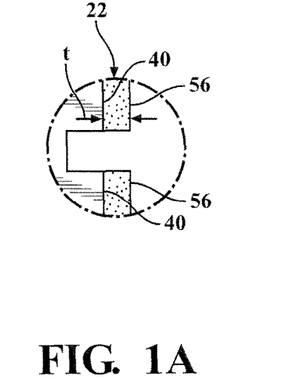
FIG. 1a is an enlarged view of a portion of the piston of FIG. 1 showing the abradable coating applied to ring lands.

In the exemplary embodiment shown in FIGS. 1 and 1*a*, the abradable coating 22 is applied to the outer surface 40 of the ring lands 38 which presents the round shape, i.e. the shape being not greater than 0.1 mm from a circular shape. The abradable coating 22 is typically applied to a thickness t of 50 to 300 μm along the ring lands 38, and the thickness t is typically approximately uniform along the ring lands 38 when initially applied. During use of the piston 20 in the internal combustion engine, the abradable coating 22 rubs against the cylinder liner as the piston 20 reciprocates along the cylinder liner. Thus, an exposed surface 56 of the abradable coating 22 wears down to a more suitable shape, for example an oval shape which is greater than 0.1 mm from a circular shape. The thickness t of the abradable coating 22 varies along the ring lands 38 after rubbing against the cylinder liner.

Figure 1B:
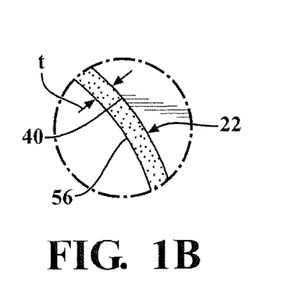
FIG. 1b is an enlarged view of a portion of the piston of FIG. 1 showing the abradable coating applied along a wrist pin bore.

In the exemplary embodiment shown in FIGS. 1 and 1b, the abradable coating 22 is applied to the outer surface 40 along the pin bores 48 of the pin bosses 46 which face inwardly and present the round shape, i.e. the shape being not greater than 0.1 mm from a circular shape. The abradable coating 22 is typically applied to a thickness t of 20 to 30 μm along the pin bores 48, and the thickness t is typically approximately uniform along the pin bores 48 when initially applied. During use of the piston 20 in the internal combustion engine, the wrist pin 50 is disposed in the pin bores 48 to connect the piston 20 to the connecting rod 52, and the abradable coating 22 rubs against the wrist pin 50 as the piston 20 reciprocates along the cylinder liner. Thus, the exposed surface 56 of the abradable coating 22 wears down to a more suitable shape, such as an oval or asymmetric shape. The worn exposed surface 56 along the pin bores 48 could have a shape which is greater than 0.1 mm from a circular shape, or less than 0.1 mm from a circular shape. For example, the abradable coating 22 could achieve a trumpet or banana shape after rubbing against the wrist pin 50. The thickness t of the abradable coating 22 typically varies along the pin bores 48 after rubbing against the wrist pin 50.

Figure 1C:
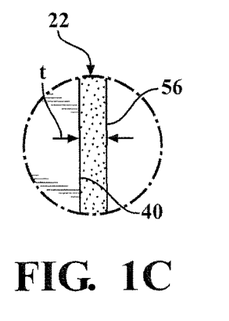
FIG. 1c is an enlarged view of a portion of the piston of FIG. 1 showing the abradable coating applied to a skirt section.
Figure 2:
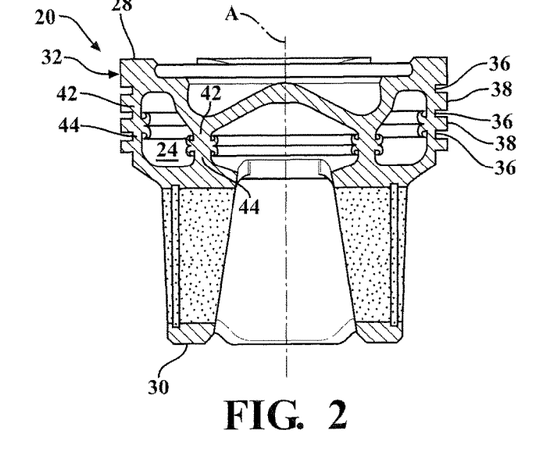
FIG. 2 is a cross-sectional view of the piston of FIG. 1.
Figure 3:
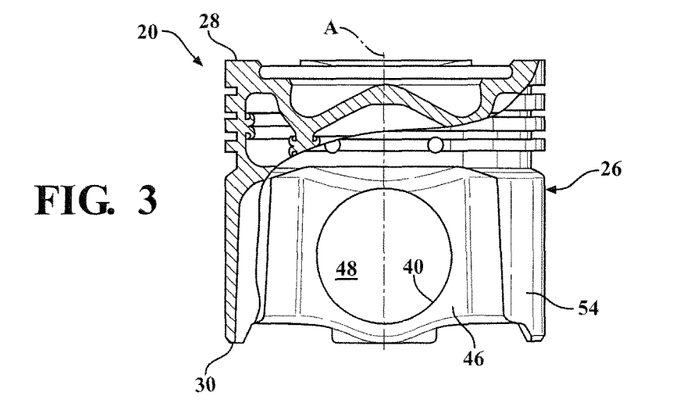
FIG. 3 is another cross-sectional view of the piston of FIG. 1.
Figure 4:
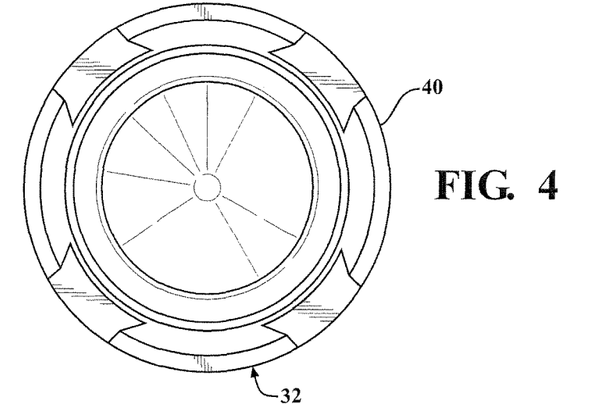
FIG. 4 is a top view of the piston of FIG. 1.
Figure 5:
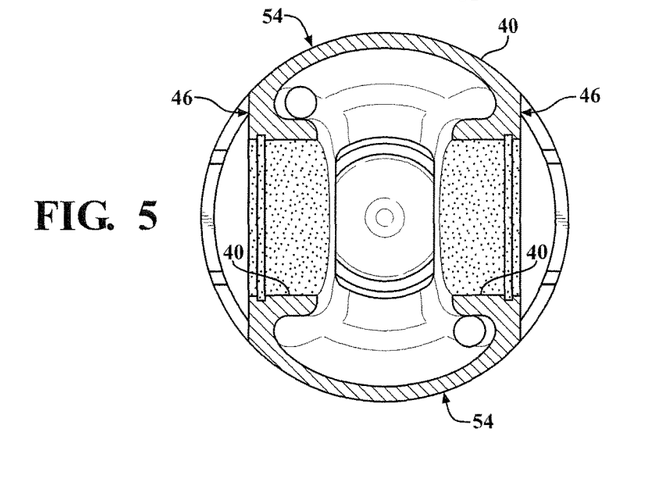
FIG. 5 is a bottom view of the piston of FIG. 1.

In the exemplary embodiment shown in FIGS. 1 and 1c, the abradable coating 22 is also applied to the outer surface 40 of the skirt sections 54 which presents the round shape, i.e. the shape being not greater than 0.1 mm from a circular shape. The abradable coating 22 is typically applied to a thickness t of 100 to 400 μm along the skirt sections 54, and the thickness t is typically approximately uniform along the skirt sections 54 when initially applied. During use of the piston 20 in the internal combustion engine, the abradable coating 22 on the skirt sections 54 rubs against the cylinder liner as the piston 20 reciprocates. Thus, an exposed surface 56 of the abradable coating 22 wears down to a more suitable shape, for example the oval shape which is greater than 0.1 mm from a circular shape. The thickness t of the abradable coating 22 varies along the skirt sections 54 after rubbing against the cylinder liner.

Another aspect of the invention provides a piston assembly for use in an internal combustion engine. In addition to the body portion 26, as described above, the piston assembly also includes the wrist pin 50 and connecting rod 52, as shown in FIG. 11. The connecting rod 52 includes a connecting end 58 with a connecting surface 60 defining a pin opening. During use of the piston assembly in the internal combustion engine, the pin opening is axially aligned with the pin bores 48 of the piston 20, and the wrist pin 50 extends through the aligned pin opening and pin bores 48 to connect the piston 20 to the connecting rod 52. The wrist pin 50 presents a contact surface 62 facing the outer surface 40 of the pin bosses 46 and the connecting surface 60 of the connecting rod 52. The abradable coating 22 only needs to be applied to the pin bosses 46 or the wrist pin 50, not both.

Figure 11A:
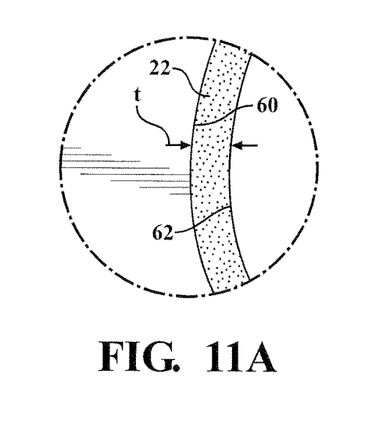
FIG. 11*a* is a cross-sectional view of a portion of FIG. 11 showing the abradable coating applied to the wrist pin.

In addition to applying the abradable coating 22 to portions of the piston 20, as described above, the abradable coating 22 can also, or alternatively, be applied to the connecting surface 60 of the connecting rod 52 and/or the contact surface 62 of the wrist pin 50. FIGS. 11 and 11a illustrate an exemplary embodiment wherein the abradable coating 22 is applied to the contact surface 62 of the wrist pin 50. However, the abradable coating 22 could alternatively be applied to the connecting surface 60 of the connecting rod 52. The abradable coating 22 only needs to be applied to the wrist pin 50 or the connecting rod 52, not both.

In the embodiment of FIGS. 11 and 11a, the contact surface 62 of the wrist pin 50 presents a shape being not greater than 0.1 mm from a circular shape, and the abradable coating 22 is applied to this round contact surface 62. The abradable coating 22 is typically applied to a thickness t of 20 to 30 μm along the contact surface 62, and the thickness t is typically approximately uniform along the contact surface 62 of the wrist pin 50 when initially applied. During use of the piston 20 in the internal combustion engine, the abradable coating 22 on the wrist pin 50 rubs against the connecting surface 60 of the connecting rod 52 and the outer surface 40 of the pin bosses 46 as the piston 20 reciprocates along the cylinder liner. Thus, the exposed surface 56 of the abradable coating 22 wears down to a more suitable shape, such as the oval, asymmetric, or other non-round shape, which could be greater than 0.1 mm from a circular shape. The thickness t of the abradable coating 22 typically varies along the wrist pin 50 after rubbing against the connecting rod 52 and piston 20. For example, the abradable coating 22 can achieve a trumpet or banana shape after rubbing against the connecting rod 52 and piston 20.

In another embodiment, the connecting surface 60 of the connecting rod 52 presents a shape being not greater than 0.1 mm from a circular shape, and the abradable coating 22 is applied to this round contact surface 62 of the connecting rod 52. The abradable coating 22 is typically applied to a thickness t of 20 to 30 μm along the connecting surface 60, and the thickness t is typically approximately uniform along the connecting surface 60 of the connecting rod 52 when initially applied. During use of the piston 20 in the internal combustion engine, the abradable coating 22 on the connecting rod 52 rubs against the contact surface 62 of the wrist pin 50 as the piston 20 reciprocates along the cylinder liner. Thus, the exposed surface 56 of the abradable coating 22 wears down to a more suitable shape, such as an oval, asymmetric, or other non-round shape which could be greater than 0.1 mm from a circular shape. The thickness t of the abradable coating 22 typically varies along the connecting surface 60 after rubbing against the wrist pin 50. For example, the abradable coating 22 along the connecting surface 60 can achieve a trumpet or banana shape after rubbing against the wrist pin 50.

Yet another aspect of the invention provides a method of manufacturing the piston 20 with the abradable coating 22 with reduced costs by avoiding deliberate machining of the outer surface 40 to a non-round shape. The method generally includes providing the body portion 26 of the piston 20, wherein a portion of the outer surface 40 presents the round shape, i.e. the shape which is not greater than 0.1 mm from a circular shape, and applying the abradable coating 22 to that portion of the outer surface 40 for rubbing against at least one other component of the internal combustion engine.

The step of providing the body portion 26 of the piston 20 typically includes casting or forging a metal material. Various different designs can be achieved during the casting or forging process. In one embodiment, the portions of the outer surface 40 of the piston 20 to which the abradable coating 22 is applied are formed to a shape which is close to the round shape during the casting or forging process.

The method further includes machining or otherwise forming the portions of the cast or forged structure to which the abradable coating 22 is applied to achieve the round shape, i.e. the shape which is not greater than 0.1 mm from a circular shape. In one embodiment, the body portion 26 of the piston 20 is machined to present a cylindrical shape (constant diameter) or barrel or tapered shape (varying diameter) extending from the upper end 28 to the lower end 30, with the round outer surface 40 along the ring lands 38 and the skirt sections 54. The pin bores 48 can also be formed by machining to present a cylindrical or barrel shape with the round outer surface 40. It is noted that machining to the round shape is less costly than machining to oval or asymmetric shapes. Other portions of the piston 20 without the abradable coating 22 can also be machined to achieve the desired design.

In cases where the piston 20 includes multiple pieces, for example the piston 20 with the separate crown 32 shown in FIG. 1, the method includes joining those pieces together to form the body portion 26. In one embodiment, the joining step includes friction welding or induction welding the crown 32 to remaining sections of the body portion 26.

Once the body portion 26 is formed, the method can optionally include another machining step, for example to machine portions of the piston 20 which will include the abradable coating 22, or portions which will be left uncoated. The outer surface 40 of the piston 20 is also cleaned or pre-treated, if required, before applying the abradable coating 22 to the outer surface 40.

The step of applying the abradable coating 22 to the outer surface 40 of the piston 20 typically includes screen printing, rolling, or spraying, for example thermal spraying. However, other processes can be used to apply the abradable coating 22. When the abradable coating 22 includes a polymer and graphite, the method typically is screen printing, rolling, or spraying. When the abradable coating 22 includes an aluminum-silicon alloy, the method typically is thermal spraying. The abradable coating 22 can be applied to a thickness t varying from 20 to 400 µm, depending on which portion of the piston 20 is coated, and the thickness t of the abradable coating 22 is typically approximately uniform when first applied.

The more suitable contact geometry along the outer surface 40 of the piston 20 is then achieved by using the coated piston 20 in the internal combustion engine. As described above, as the piston 20 reciprocates along the cylinder liner, the abradable coating 22 rubs against at least one other component of the internal combustion engine such that an exposed surface 56 of the abradable coating 22 presents the more suitable shape which could be greater than 0.1 mm from a circular shape. For example, if the abradable coating 22 is applied to the ring lands 38 or skirt sections 54, the abradable coating 22 rubs against the cylinder liner and can wear down to an oval shape. If the abradable coating 22 is applied along the pin bores 48 of the pin bosses 46, then the abradable coating 22 rubs against the wrist pin 50 and can wear down to an oval or asymmetric shape. The thickness t of the abradable coating 22 is no longer uniform after rubbing against another component in the internal combustion engine.

Another aspect of the invention provides a method of manufacturing the piston assembly for use in the internal combustion engine. The method generally includes providing the piston 20, the connecting rod 52, and the wrist pin 50, as described above, and applying the abradable coating 22 to at least one of those components. The wrist pin 50 and connecting rod 52 can be prepared for the coating process by cleaning, pre-treating, or other known methods. The wrist pin 50 and connecting rod 52 can also be machined to achieve the round shape, before applying the abradable coating 22. The abradable coating 22 is typically applied to an approximately uniform thickness t ranging from 20 to 30 µm along the connecting rod 52 or wrist pin 50 by spraying. However, other techniques could be used to apply the abradable coating 22.

In one embodiment, method includes applying the abradable coating 22 to the round outer surface 40 of the piston 20 along the ring lands 38, skirt sections 54, and/or pin bosses 46, as described above, and rubbing the abradable coating 22 against another component to achieve the more suitable shape, which could be greater than 0.1 mm from a circular shape. In another embodiment, the method includes applying the abradable coating 22 to the contact surface 62 of the wrist pin 50, and rubbing the abradable coating 22 against the outer surface 40 of the pin bosses 46 and connecting surface 60 of the connecting rod 52 so that the abradable coating 22 achieves a suitable shape. In yet another embodiment, the method includes applying the abradable coating 22 to at least one of the outer surface 40 of the pin bosses 46 and the connecting surface 60 of the connecting rod 52, and rubbing the abradable coating 22 against the contact surface 62 of the wrist pin 50 so that the abradable coating 22 presents the a suitable shape, which could be greater than 0.1 mm from a circular shape.

Obviously, many modifications and variations of the present invention are possible in light of the above teachings and may be practiced otherwise than as specifically described while within the scope of the appended claims.

What is claimed is:

1. A piston for use in an internal combustion engine, comprising:
a body portion presenting an outer surface, a portion of said outer surface presenting a shape being not greater than 0.1 mm from a circular shape; and
an abradable coating applied to said portion of said outer surface for rubbing against at least one other component of the internal combustion engine wherein an exposed surface of said abradable coating presents a shape being greater than 0.1 mm from a circular shape after said abradable coating rubs against the at least one other component of the internal combustion engine.

2. The piston of claim 1, wherein said body portion of said piston includes a crown having at least one ring groove extending about a center axis and ring lands each disposed adjacent one of said ring grooves, and said abradable coating is applied to said outer surface along said ring lands.

3. The piston of claim 2, wherein an exposed surface of said abradable coating along said ring lands presents a shape being greater than 0.1 mm from a circular shape after said abradable coating rubs against the at least one other component of the internal combustion engine.

4. The piston of claim 1, wherein said body portion includes a crown, said body portion includes a pair of pin bosses depending from said crown and spaced from one another about a center axis, each of said pin bosses defines a pin bore for receiving a wrist pin, and said abradable coating is applied to said outer surface along said pin bore of said pin bosses.

5. The piston of claim 1, wherein said body portion includes a crown, said body portion includes a pair of skirt sections spacing a pair of pin bosses from one another about a center axis and depending from said crown, and said abradable coating is applied to said outer surface along said skirt sections.

6. The piston of claim 1, wherein said abradable coating includes at least one of: a polymer, an aluminum-silicon alloy, graphite, and hexagonal boron nitride.

7. The piston of claim 1, wherein said abradable coating has a thickness of 20 to 400 µm.

8. The piston of claim 1, wherein said body portion is formed of a metal material, said metal material being selected from an iron-based material and an aluminum-based material;
  said body portion extends around a center axis and longitudinally along said center axis from an upper end to a lower end;
  said body portion includes a crown extending circumferentially about said center axis from said upper end toward said lower end;
  said crown defines at least one ring groove extending circumferentially about said center axis for receiving at least one ring;
  a plurality of ring lands each disposed adjacent one of said ring grooves;
  said outer surface of said ring lands presenting said shape being not greater than 0.1 mm from a circular shape;
  said abradable coating applied to said outer surface of said ring lands;
  said abradable coating having a thickness of 50 to 300 µm along said ring lands;
  said abradable coating including at least one of: a polymer, an aluminum-silicon alloy, graphite, and hexagonal boron nitride;
  said body portion including a pair of pin bosses spaced from one another about said center axis and depending from said crown to said lower end;
  each of said pin bosses defining a pin bore for receiving a wrist pin;
  said outer surface along each of said pin bosses defining said pin bore, and said pin bore presenting said shape being not greater than 0.1 mm from a circular shape;
  said abradable coating being applied to said outer surface along said pin bores of said pin bosses;
  said abradable coating having a thickness of 20 to 30 µm along said pin bores;
  said body portion including a pair of skirt sections spacing said pin bosses from one another about said center axis and depending from said lower crown to said lower end;
  said outer surface of said skirt sections presenting said shape being not greater than 0.1 mm from a circular shape;
  an abradable coating applied to said outer surface of said skirt sections; and
  said abradable coating having a thickness of 100 to 400 µm along said skirt sections.

9. A piston assembly for use in an internal combustion engine, comprising:
  a piston including a body portion presenting an outer surface,
  said body portion including a crown and a pair of pin bosses depending from said crown and spaced from one another about a center axis, each of said pin bosses defines a pin bore;
  a connecting rod including a connecting end disposed between said pin bosses of said piston;
  said connecting end presenting a connecting surface defining a pin opening, said pin opening being axially aligned with said pin bores of said piston;
  a wrist pin extending through said aligned pin bores of said piston and pin opening of said connecting rod for connecting said piston to said connecting rod, said wrist pin presenting a contact surface facing said outer surface of said pin bosses and said connecting surface of said connecting rod;
  at least one of said outer surface of said piston, said connecting surface of said connecting rod, and said contact surface of said wrist pin including a portion presenting a shape being not greater than 0.1 mm from a circular shape; and
  an abradable coating applied to said portion of said at least one surface wherein an exposed surface of said abradable coating presents a shape being greater than 0.1 mm from a circular shape after said abradable coating rubs against the at least one other component of the internal combustion engine.

10. The piston assembly of claim 9, wherein said abradable coating is applied to said contact surface of said wrist pin.

11. The piston assembly of claim 9, wherein said abradable coating is applied to at least one of said outer surface of said pin bosses and said connecting surface of said connecting rod.

12. A method of manufacturing a piston for use in an internal combustion engine, comprising the steps of:
  providing a body portion of a piston presenting an outer surface, a portion of the outer surface presenting a shape being not greater than 0.1 mm from a circular shape; and
  applying an abradable coating to the portion of the outer surface for rubbing against at least one other component of the internal combustion engine wherein an exposed surface of the abradable coating presents a shape being greater than 0.1 mm from a circular shape after rubbing the abradable coating against at least one other component of the internal combustion engine.

13. The method of claim 12, wherein the step of applying the abradable coating includes at least one of: screen printing, rolling, and spraying the abradable coating onto the portion of the outer surface.

14. The method of claim 13, wherein the step of applying the abradable coating includes thermal spraying the abradable coating onto the portion of the outer surface.

15. The method of claim 12, wherein the step of providing the body portion of the piston includes machining the portion of the outer surface to the shape being not greater than 0.1 mm from a circular shape.

16. A method of manufacturing a piston assembly for use in an internal combustion engine, comprising the steps of:
  providing a body portion of a piston, the body portion presenting an outer surface, the body portion including a crown and a pair of pin bosses depending from the crown and spaced from one another about a center axis, and each of the pin bosses defining a pin bore;
  providing a connecting rod for being disposed between the pin bosses of the piston, the connecting rod including a connecting end with a connecting surface defining a pin opening for being axially aligned with the pin bosses of the piston;
  providing a wrist pin for extending through the aligned pin bosses of the piston and pin bore of the connecting rod for connecting the piston to the connecting rod, the wrist pin presenting a contact surface for facing the outer surface of the pin bosses and the connecting surface of the connecting rod; and applying an abradable coating to at least one of the outer surface of the piston, the connecting surface of the connecting rod, and the contact surface of the wrist pin including a portion presenting a shape being not greater than 0.1 mm from a circular shape wherein the abradable coating presents a shape greater than 0.1 mm from a circular shape after rubbing the abradable coating against another component.

17. The method of claim 16, wherein the step of applying the abradable coating includes at least one of screen printing, rolling, and spraying the abradable coating onto the portion of the outer surface.

18. A piston for use in an internal combustion engine, comprising:

a body portion presenting an outer surface, a portion of said outer surface presenting a shape being not greater than 0.1 mm from a circular shape;

said body portion of said piston includes a crown having at least one ring groove extending about a center axis and ring lands each disposed adjacent one of said ring grooves, and said abradable coating is applied to said outer surface along said ring lands; and an abradable coating applied to said portion of said outer surface for rubbing against at least one other component of the internal combustion engine wherein an exposed surface of said abradable coating along said ring lands presents a shape being greater than 0.1 mm from a circular shape after said abradable coating rubs against the at least one other component of the internal combustion engine.

* * * * *

(12) EX PARTE REEXAMINATION CERTIFICATE (11802nd)

United States Patent
Inwood et al.

(10) Number: US 9,909,528 C1
(45) Certificate Issued: Feb. 8, 2021

(54) PISTON WITH ABRADABLE COATING TO GENERATE APPROPRIATE CONTACT GEOMETRY ON RUNNING SURFACE

(71) Applicant: Federal-Mogul Corporation, Southfield, MI (US)

(72) Inventors: Bruce Inwood, Fenton, MI (US); Jeffrey L. Riffe, Troy, MI (US)

(73) Assignee: FEDERAL-MOGUL LLC, Southfield, MI (US)

Reexamination Request:
No. 90/014,442, Jan. 31, 2020

Reexamination Certificate for:
Patent No.: 9,909,528
Issued: Mar. 6, 2018
Appl. No.: 14/613,603
Filed: Feb. 4, 2015

Related U.S. Application Data (60) Provisional application No. 61/935,518, filed on Feb. 4, 2014.

(51) Int. Cl.
*F16J 1/01* (2006.01)
*F02F 3/10* (2006.01)
*F16J 1/16* (2006.01)
*F02B 79/00* (2006.01)

(52) U.S. Cl.
CPC ............... *F02F 3/10* (2013.01); *F02B 79/00* (2013.01); *F16J 1/16* (2013.01); *Y10T 29/49263* (2015.01)

(58) Field of Classification Search
None
See application file for complete search history.

(56) References Cited

To view the complete listing of prior art documents cited during the proceeding for Reexamination Control Number 90/014,442, please refer to the USPTO's public Patent Application Information Retrieval (PAIR) system under the Display References tab.

*Primary Examiner* — Peter C English (57) ABSTRACT

A piston including an abradable coating applied to a round surface of the piston is provided. The shape of the round surface is not greater than 0.1 mm from a circular shape, and thus is relatively inexpensive to machine. As the piston reciprocates in an internal combustion engine, the abradable coating rubs against another component, such as a cylinder liner or wrist pin, to achieve suitable contact geometry, such as an oval, asymmetric, or other non-round shape. Thus, a costly machining process is not required to achieve the desired contact geometry. The abradable coating can also be applied to ring lands, skirt sections, or along pin bores of the piston. The abradable coating can also be applied to a wrist pin or an opening of a connecting rod which receives the wrist pin. The abradable coating can be formed from a polymer-based material or an aluminum-silicon alloy-based material.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-18 are cancelled.

\* \* \* \* \*